(12) United States Patent
Suzuki (10) Patent No.: US 11,006,012 B2
(45) Date of Patent: May 11, 2021

(54) INFORMATION PROCESSING APPARATUS FOR DETERMINING A ROTATION MODE FOR PRINTING DATA

(71) Applicant: FUJI XEROX CO., LTD., Tokyo (JP)

(72) Inventor: Kazutoshi Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/653,137

(22) Filed: Oct. 15, 2019

(65) Prior Publication Data
US 2020/0404113 A1    Dec. 24, 2020

(30) Foreign Application Priority Data

Jun. 21, 2019 (JP) .............................. JP2019-115622

(51) Int. Cl.
*H04N 1/00* (2006.01)

(52) U.S. Cl.
CPC ..... *H04N 1/00639* (2013.01); *H04N 1/00583* (2013.01); *H04N 1/00761* (2013.01)

(58) Field of Classification Search
CPC ........... H04N 1/00639; H04N 1/00583; H04N 1/00761
See application file for complete search history.

(56) References Cited

U.S. PATENT DOCUMENTS

| 2005/0187088 A1* | 8/2005 | Tsukuba | B65H 45/12 493/384 |
| 2009/0227436 A1* | 9/2009 | Takahashi | B65H 45/04 493/420 |
| 2012/0177290 A1* | 7/2012 | Le Glaunec | G06K 9/00449 382/176 |
| 2013/0250361 A1* | 9/2013 | Minegishi | G06F 3/1285 358/1.18 |
| 2017/0150007 A1* | 5/2017 | Snowball | H04N 1/04 |

FOREIGN PATENT DOCUMENTS

| JP | 2012-28905 A | 2/2012 |
| JP | 2014-23051 A | 2/2014 |
| JP | 5614144 B2 | 10/2014 |
| JP | 5924175 B2 | 5/2016 |

* cited by examiner

*Primary Examiner* — Benjamin O Dulaney
(74) *Attorney, Agent, or Firm* — Oliff PLC (57) ABSTRACT

An information processing apparatus includes a receiving unit that receives printing data and a switching unit that performs switching between a second rotation mode and a first rotation mode. The first rotation mode is a mode in which an orientation in the printing data undergoes rotation through an angle decided in accordance with an analysis of content of the printing data. The second rotation mode is a mode in which if an angle for an output size in the printing data is stored in a memory, the angle is read out from the memory, and the orientation in the printing data undergoes the rotation.

8 Claims, 12 Drawing Sheets

| SHEET SIZE | SHEET ORIENTATION | HOW TO FOLD SHEET | FINISHED SHAPE |
|---|---|---|---|
| A0 | PORTRAIT | BINDING MARGINS 0/20/25/30/50 mm | |
| A1 | PORTRAIT | BINDING MARGINS 0/20/25/30/50 mm | |
| | LANDSCAPE | BINDING MARGINS 0/20/25/30/50 mm | |
| A2 | PORTRAIT | BINDING MARGINS 0/18 mm | |
| | LANDSCAPE (7090 TYPE) | BINDING MARGINS 0/18 mm | |
| | LANDSCAPE (3090 TYPE) | BINDING MARGINS 0/18 mm | |
| A3 | PORTRAIT LANDSCAPE | BINDING MARGINS 0/105 mm (FIXED) | |

◨ TITLE FIELD

FIG. 3

|  | FOLDING TYPE | | |
|---|---|---|---|
| SHEET SIZE AND ORIENTATION | FAN FOLD | CROSS FOLD | SPECIAL FOLD |
| A0 PORTRAIT (JIS) | LOWER LEFT CORNER | LOWER LEFT CORNER | LOWER LEFT CORNER |
| A1 PORTRAIT (JIS) | LOWER LEFT CORNER | LOWER LEFT CORNER | UPPER RIGHT CORNER |

| OUTPUT SIZE AND ORIENTATION | ROTATION ANGLE |
|---|---|
| A0 LANDSCAPE | 0 |
| A0 PORTRAIT | NOT SET |
| A1 LANDSCAPE | 180 |
| A1 PORTRAIT | NOT SET |
| A2 LANDSCAPE | NOT SET |
| A2 PORTRAIT | 270 |
| A3 LANDSCAPE | NOT SET |
| A3 PORTRAIT | NOT SET |

| OUTPUT SIZE AND ORIENTATION | ROTATION ANGLE IN HIGHER-RANK APPARATUS 10A | ROTATION ANGLE IN HIGHER-RANK APPARATUS 10B |
|---|---|---|
| A0 LANDSCAPE | 0 | 90 |
| A0 PORTRAIT | NOT SET | 0 |
| A1 LANDSCAPE | 180 | 0 |
| A1 PORTRAIT | NOT SET | NOT SET |
| A2 LANDSCAPE | NOT SET | 180 |
| A2 PORTRAIT | 270 | 180 |
| A3 LANDSCAPE | NOT SET | 90 |
| A3 PORTRAIT | NOT SET | 0 |

INFORMATION PROCESSING APPARATUS FOR DETERMINING A ROTATION MODE FOR PRINTING DATA

CROSS-REFERENCE TO RELATED APPLICATIONS

This application is based on and claims priority under 35 USC 119 from Japanese Patent Application No. 2019-115622 filed Jun. 21, 2019.

BACKGROUND

(i) Technical Field

The present disclosure relates to an information processing apparatus and a non-transitory computer readable medium.

(ii) Related Art

A folding device that performs folding finishing on an output sheet is connected in some cases to an image forming apparatus on the subsequent processing side. It is desired that the folding device support various folding types and perform folding to locate a specific image designated in advance on the uppermost surface of a sheet undergoing the folding finishing.

Nevertheless, the folding device supports only predetermined folding types, and thus the orientation of the sheet output from the image forming apparatus needs to match the orientation of the specific image to enable the folding device to fold the sheet appropriately.

For example, Japanese Patent No. 5924175 describes technology by which every time the printing data is received from a higher-rank apparatus, the location of a title field that is a specific image is projected through processing of printing data.

For example, Japanese Patent No. 5614144 describes technology by which a user manually sets the rotation angle of a data image for each orientation in the printing data and each output sheet size to output a sheet in an appropriate orientation from the image forming apparatus.

SUMMARY

However, the method, such as the technology described in Japanese Patent No. 5924175, by which the location of the title field is projected from the printing data every time the printing data is input needs time taken to project the location for each printing data, and the productivity thereof is deteriorated in accordance with the projection time. In the technology described in Japanese Patent No. 5614144, the user needs to manually set the rotation angle of the data image on a drawing-orientation and output-sheet-size basis, and the work burdens the user.

Aspects of non-limiting embodiments of the present disclosure relate to reducing time taken until the outputting of a printed sheet without increasing the work load of a user, unlike the setting of a rotation angle performed manually in advance by a user on a per printing data basis, compared with a case where the rotation angle is analyzed for all pieces of the printing data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a receiving unit that receives printing data and a switching unit that performs switching between a second rotation mode and a first rotation mode. The first rotation mode is a mode in which an orientation in the printing data undergoes rotation through an angle decided in accordance with an analysis of content of the printing data. The second rotation mode is a mode in which if an angle for an output size in the printing data is stored in a memory, the angle is read out from the memory, and the orientation in the printing data undergoes the rotation.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described with reference to the drawings.

Exemplary Embodiment 1

Overall System Configuration

Figure 1:
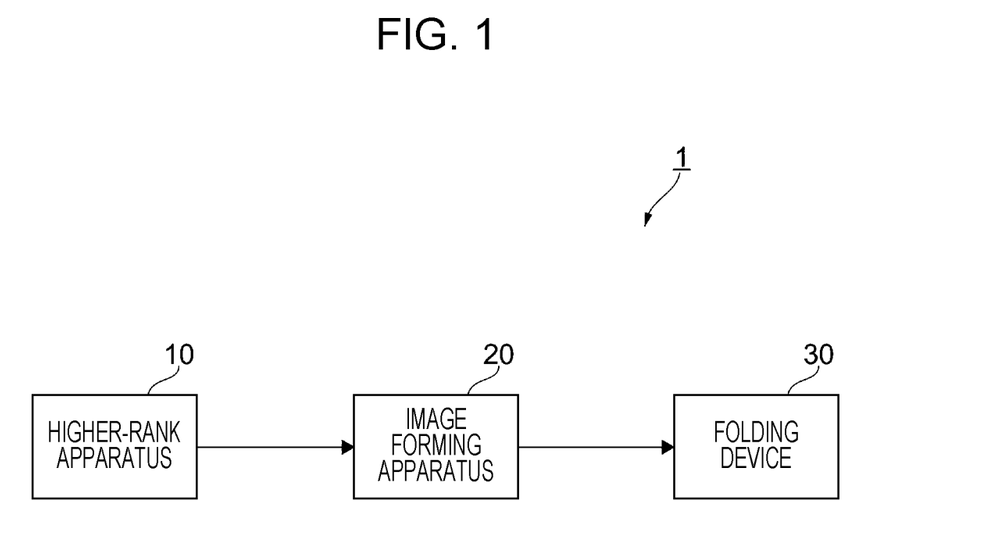
FIG. 1 is a diagram for explaining the conceptual configuration of an image processing system used in Exemplary Embodiment 1.

FIG. 1 is a diagram for explaining the conceptual configuration of an image processing system 1 used in Exemplary Embodiment 1.

The image processing system 1 in this exemplary embodiment handles sheets of large sizes such as an A0 size, an A1 size, and an A2 size. In this exemplary embodiment, the term "a sheet of a large size" denotes a sheet of a larger size than the size of a sheet used in an office.

Note that the sheet size is not limited to the A series and may be a B series, a C series, or a size other than these series. The technology described in this exemplary embodiment is applied regardless of the sheet size and thus applicable to a sheet of a size other than the large size.

The image processing system 1 illustrated in FIG. 1 includes a higher-rank apparatus 10 that outputs printing data, an image forming apparatus 20 that forms an image corresponding to the received printing data on the surface of a sheet, and a folding device 30 that performs folding finishing on the sheet output from the image forming apparatus 20.

The higher-rank apparatus 10 in this exemplary embodiment is a computer terminal, and various application programs handling a document, an image, document data regarding a drawing or the like are installed thereon.

This exemplary embodiment assumes a computer aided design (CAD) program for drawing as an application program. Note that the orientation of a document displayed on the operation screen of the higher-rank apparatus 10 does not necessarily match the orientation in printing data output from the higher-rank apparatus 10. The orientation in the printing data is decided on the basis of, for example, the orientation of a CAD coordinate system and an output size.

The image forming apparatus 20 in this exemplary embodiment includes a control unit that controls overall operations of the image forming apparatus 20, a printing unit that prints an image corresponding to the printing data on the sheet, a memory device that stores the printing data and the like, an operation receiving unit that receives an operation by a worker, and a display device that displays a work screen.

The control unit includes a central processing unit (CPU), a read only memory (ROM) that stores firmware, a basic input output system (BIOS), and the like, a random access memory (RAM) used as a work area, and other components. The control unit provides various functions by running programs. The printing unit is a device that prints an image on the surface of a sheet by using an electrophotographic system, an inkjet system, or the like. The memory device is a nonvolatile memory device and is composed of, for example, a hard disk device. The memory device is an example of a memory. The operation receiving unit is composed of a switch, a button, a keyboard, and other components. The display device is composed of a liquid crystal display or an organic electro luminescence (EL) display.

The folding device 30 is a device that performs the folding finishing on the sheet output from the image forming apparatus 20. The folding device 30 supports multiple folding types. The folding types include, for example, a fan fold, a cross fold, and a special fold.

Figure 2:
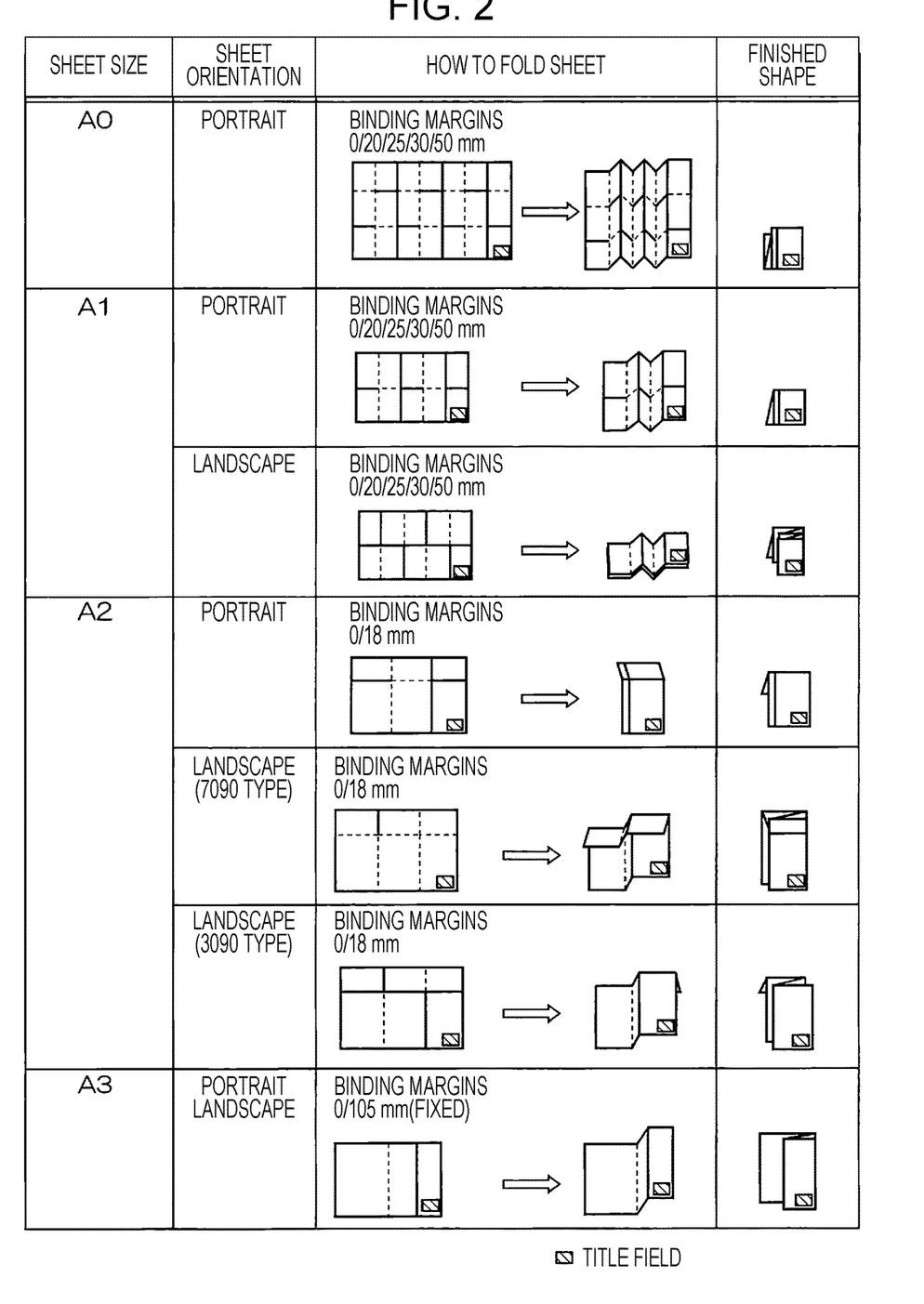
FIG. 2 is a diagram illustrating an example of a fan fold.

FIG. 2 is a diagram illustrating an example of the fan fold. FIG. 2 illustrates relationships between a sheet orientation and a folding type for respective sheet sizes of A0, A1, A2, and A3.

A hatched rectangular area is a title field. The title field is an example of a specific image to be located on the uppermost surface of the sheet as illustrated in the finished shape in FIG. 2 after the folding device 30 folds the sheet. The image used as the specific image is designated in advance in an image in the printing data.

A solid line and a broken line respectively represent a mountain fold part and a valley fold part. To locate the title field after the folding on the uppermost surface of a sheet, the location of the title field of the sheet input in the folding device 30 needs to match the location decided in accordance with the sheet size and the folding type of the sheet. In FIG. 2, the title field needs to be located in the lower right corner of the sheet.

Figure 3:
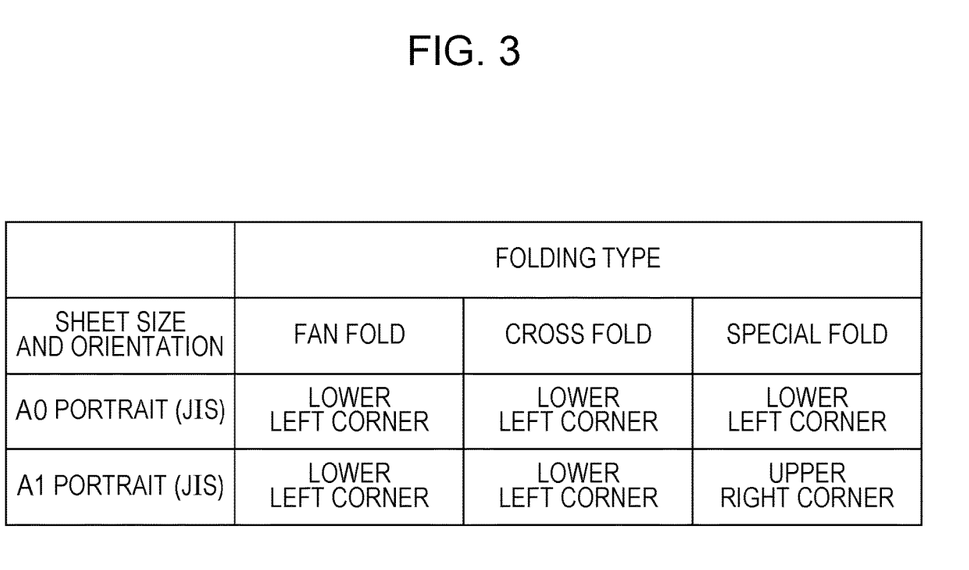
FIG. 3 is a table illustrating the combinations of the size and the orientation of a sheet with a folding type that lead to a desirable location of a title field when the folding device performs predetermined folding finishing.

FIG. 3 is a table illustrating combinations of the size and the orientation of a sheet with a folding type that lead to a desirable location of a title field when the folding device 30 performs predetermined folding finishing.

For example, in a case where the fan fold is performed on an A0 size sheet transported in a short edge direction ("A0 portrait" in FIG. 3), it is desired that the title field be located in the lower left corner of the sheet. The same holds true for the cross fold and the special fold.

For example, in a case where the fan fold or the cross fold is performed on an A1 size sheet transported in the short edge direction ("A1 portrait" in FIG. 3), it is desired that the title field be located in the lower left corner of the sheet. In the special fold, it is desired that the title field be located in the upper right corner of the sheet.

Note that each combination illustrated FIG. 3 is an example, and a desirable location differs depending on an actual machine.

Functional Configuration of Image Forming Apparatus

Figure 4:
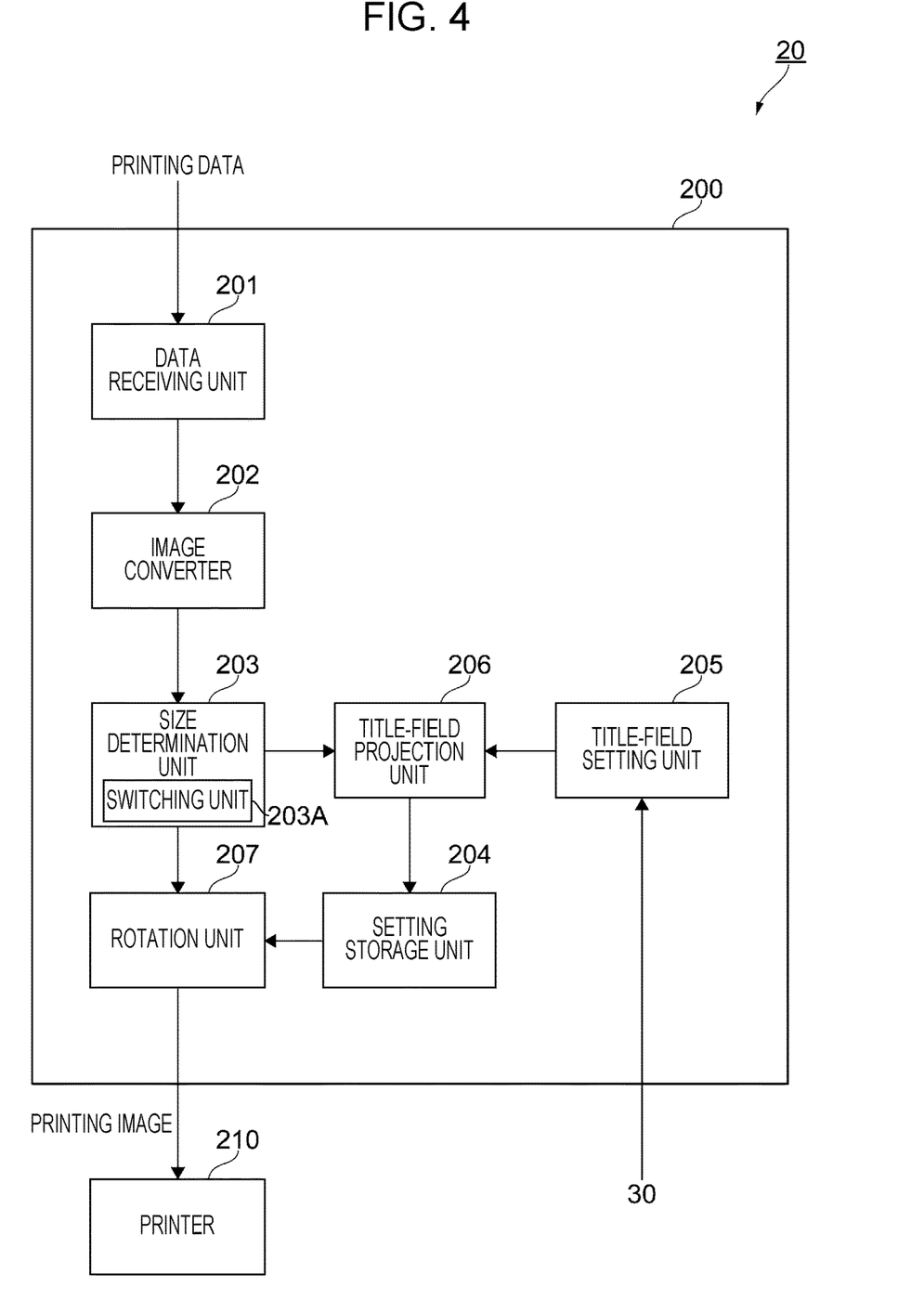
FIG. 4 is a diagram for explaining an example functional configuration of an image forming apparatus.

FIG. 4 is a diagram for explaining an example functional configuration of the image forming apparatus 20.

The image forming apparatus 20 has a function as a rotation processing unit 200 and a function as a printer 210. Of these functions, the rotation processing unit 200 is implemented in such a manner that the aforementioned control unit runs a corresponding one of the programs.

The rotation processing unit 200 includes a data receiving unit 201 that receives printing data from the higher-rank apparatus 10 (see FIG. 1), an image converter 202 that converts the received printing data into a printing image, a size determination unit 203 that identifies the output size and the orientation in the generated printing image, a setting storage unit 204 that stores a setting of a rotation angle for the output size and the orientation, a title-field setting unit 205 that sets a title field location processable by the folding device 30, a title-field projection unit 206 that extracts the title field location from the printing image, and a rotation unit 207 that rotates the printing image to the orientation desired in the folding finishing. The rotation processing unit 200 is also an example of an information processing apparatus.

In this exemplary embodiment, the data receiving unit 201 is connected to the one higher-rank apparatus 10. The data receiving unit 201 is an example of a receiving unit.

The size determination unit 203 in this exemplary embodiment is provided with a switching unit 203A that performs switching of whether to execute a process for projecting the location of the title field included in the printing image.

After the output size and the orientation are determined, the switching unit 203A in this exemplary embodiment verifies whether the rotation angle for the determined output size and the orientation has been stored in the setting storage unit 204.

If the rotation angle for the determined output size and the orientation has not been stored in the setting storage unit 204, the switching unit 203A performs switching to a rotation mode in which a title-field projection process is executed. In this case, the title-field projection unit 206 executes the process for projecting the location of the title field within the sheet and a rotation-angle decision process for deciding a rotation angle causing the projected location to match the location of the title field requested by the folding device 30. The rotation mode is an example of a first rotation mode.

In contrast, if the rotation angle for the determined output size and the orientation has been stored in the setting storage unit 204, the switching unit 203A performs switching to a rotation mode in which the title-field projection process is not executed. In this case, the process by the title-field projection unit 206 is not executed. The rotation mode is an example of a second rotation mode. The switching unit 203A is an example of a switching unit.

The setting storage unit 204 stores a relationship between a rotation angle for an output size and an orientation in the memory device.

Figure 5:
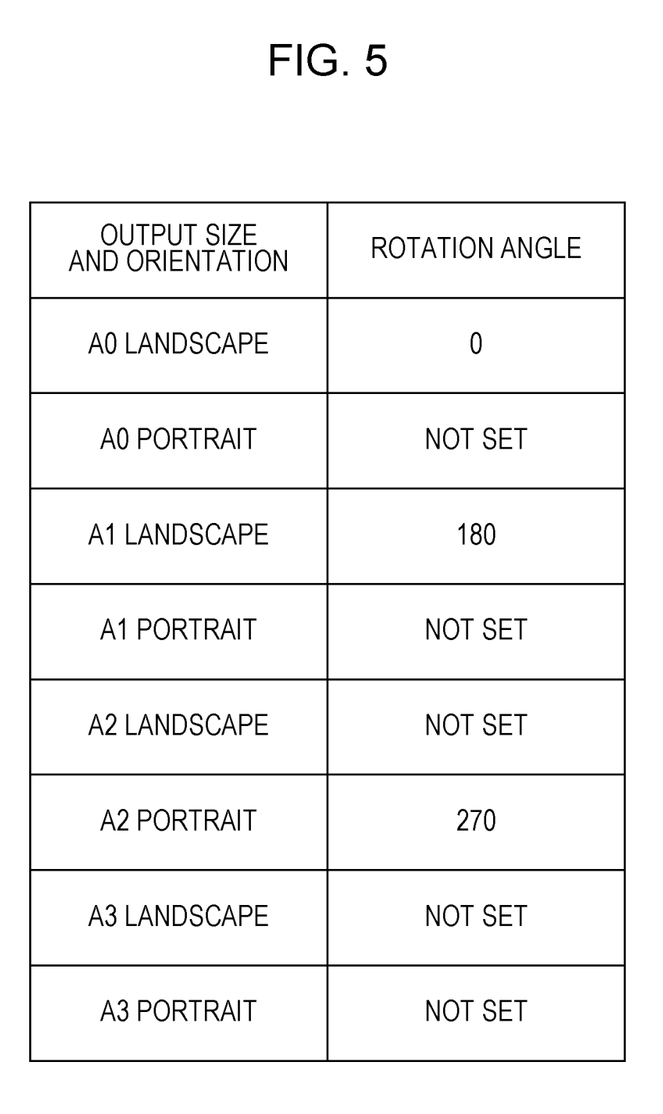
FIG. 5 is a table illustrating an example of settings of a rotation angle for an output size and an orientation in a setting storage unit.

FIG. 5 is a table illustrating an example of settings of a rotation angle for an output size and an orientation in the setting storage unit 204. In the example illustrated in FIG. 5, the rotation angle for the printing data for the A0 output size sheet to be transported in the long edge direction ("A0 landscape" in FIG. 5) is zero degrees, the rotation angle for the printing data for the A1 output size sheet to be transported in the long edge direction ("A1 landscape" in FIG. 5) is 180 degrees, and the rotation angle for the printing data for the A2 output size sheet to be transported in the short edge direction ("A2 portrait" in FIG. 5) is 270 degrees.

In contrast, the rotation angles for the respective pieces of printing data for the A0 output size sheet to be transported in the short edge direction ("A0 portrait" in FIG. 5), the A1 output size sheet to be transported in the short edge direction ("A1 portrait" in FIG. 5), the A2 output size sheet to be transported in the long edge direction ("A2 landscape" in FIG. 5), the A3 output size sheet to be transported in the long edge direction ("A3 landscape" in FIG. 5), and the A3 output size sheet to be transported in the short edge direction ("A3 portrait" in FIG. 5) are not set.

Referring back to FIG. 4, description is provided.

The title-field setting unit 205 acquires information (see FIG. 3) regarding the title field location suitable for the output size and the orientation that are desired for the folding type from the folding device 30 and provides the title-field projection unit 206 with the information.

The title-field projection unit 206 projects the location of the title field from the printing image and decides the rotation angle causing the projected location to match the location of the title field requested by the folding device 30 for the output size and the orientation. The details of the process will be described later.

The rotation unit 207 rotates the printing image in accordance with the rotation angle held in the setting storage unit 204 and outputs the printing image to the printer 210.

Configuration Details of Title-Field Projection Unit

Figure 6:
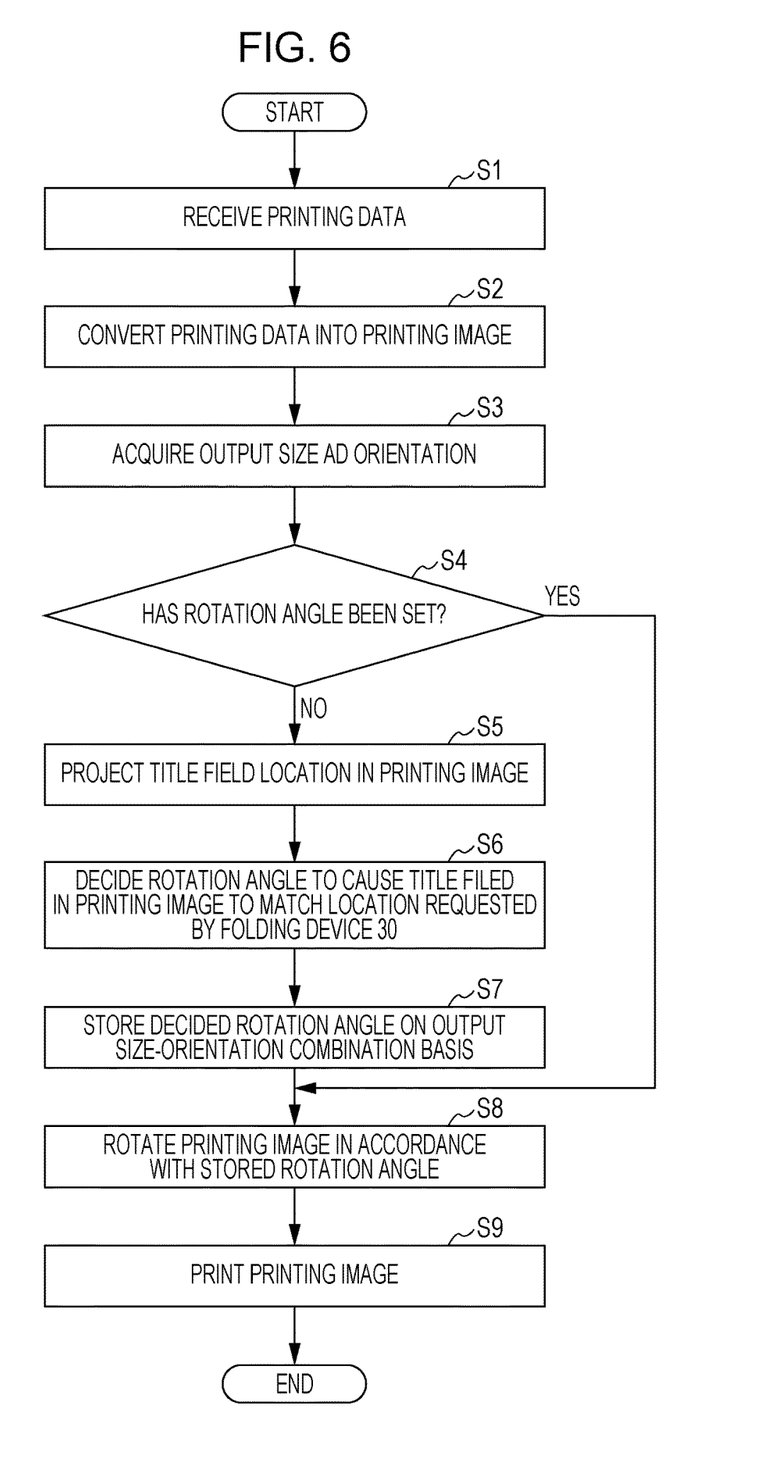
FIG. 6 is a flowchart for explaining a rotation process executed by a rotation processing unit used in Exemplary Embodiment 1.

FIG. 6 is a flowchart for explaining the rotation process executed by the rotation processing unit 200 (see FIG. 4) used in Exemplary Embodiment 1. References S in FIG. 6 denote steps.

First, the rotation processing unit 200 receives printing data (step 1). The rotation processing unit 200 converts the printing data into a printing image (step 2). The rotation processing unit 200 acquires an output size and an orientation from the printing image (step 3).

The rotation processing unit 200 accesses the setting storage unit 204 and determines whether a rotation angle has been set for the output size and the orientation to be processed (step 4).

If the result is negative in step 4, the rotation processing unit 200 projects the location of the title field in the printing image (step 5). This step corresponds to the process executed by the title-field projection unit 206 (see FIG. 4).

After the location of the title field is projected, the rotation processing unit 200 decides the rotation angle for causing the location of the title field in the printing image to match the location requested by the folding device 30 (see FIG. 1) (step 6).

After the rotation angle is decided, the rotation processing unit 200 stores the decided rotation angle on an output size-orientation combination basis (step 7).

After step 7, or if the result is affirmative in step 4, the rotation processing unit 200 rotates the printing image in accordance with the stored rotation angle (step 8).

The rotation processing unit 200 provides the printer 210 (see FIG. 4) with the rotated printing image, and the printing image is printed (step 9).

Processing Details of Steps S5 to 7

Figure 7:
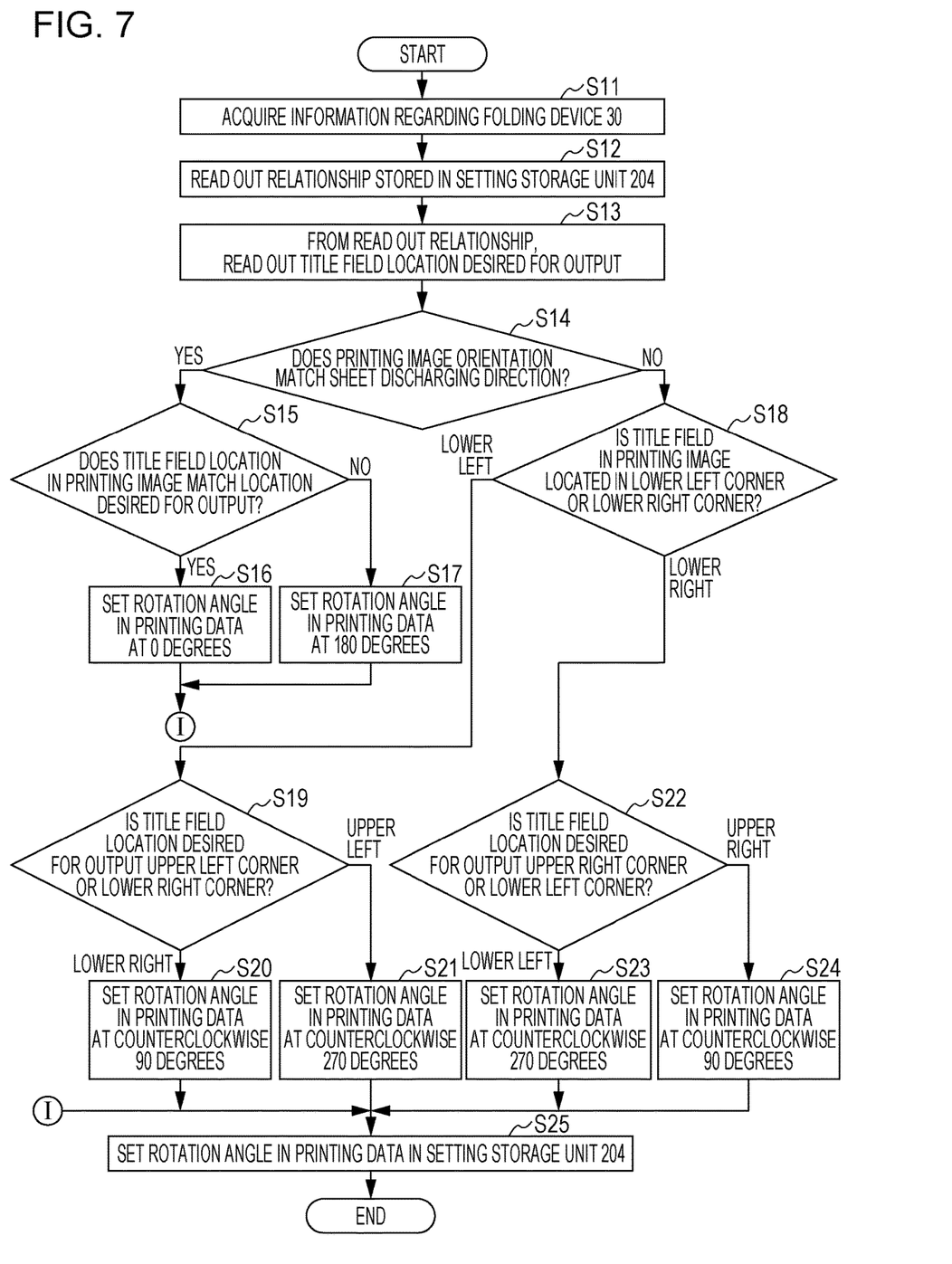
FIG. 7 is a flowchart for explaining processing details corresponding to steps 5 to 7 of the rotation process.

FIG. 7 is a flowchart for explaining processing details corresponding to steps 5 to S7.

Upon start of step 5, the rotation processing unit 200 acquires information regarding the folding device 30 (see FIG. 1) (step 11). The information regarding the folding device 30 includes, for example, pieces of information regarding the size and the orientation of a sheet to be folded and a folding type used by the folding device 30.

The rotation processing unit 200 reads out a relationship stored in the setting storage unit 204 (see FIG. 4) and matching the information regarding the folding device 30 (step 12).

From the relationship read out, the rotation processing unit 200 reads out the location of the title field desired for output (step 13).

The rotation processing unit 200 determines whether the orientation in the printing image matches the sheet discharging direction.

If the result is affirmative in step 14, the rotation processing unit 200 determines whether the location of the title field in the printing image matches the location desired for output (step 15). Note that the location of the title field is detected, for example, by performing matching with an image set in advance for the title field.

If the result is affirmative in step 15, the rotation processing unit 200 sets the rotation angle for the printing data at zero degrees (step 16).

The rotation processing unit 200 stores the rotation angle for the printing data in the setting storage unit 204 (step 25) and then terminates the process.

If the result is negative in step 15, the rotation processing unit 200 sets the rotation angle for the printing data at 180 degrees (step 17).

Also in this case, the rotation processing unit 200 stores the rotation angle for the printing data in the setting storage unit 204 (step 25) and then terminates the process.

In contrast, if the result is negative in step 14, the rotation processing unit 200 determines whether the title field in the printing image is located in the lower left corner or the lower right corner (step 18).

If the detected location of the title field is the lower left corner, the rotation processing unit 200 determines whether the location of the title field desired for output is the upper left corner or the lower right corner (step 19).

If the location of the title field desired for output is the lower right corner, the rotation processing unit 200 sets the rotation angle for the printing data at counterclockwise 90 degrees (step 20). The rotation processing unit 200 stores the rotation angle for the printing data in the setting storage unit 204 (step 25).

In contrast, if the location of the title field desired for output is the upper left corner, the rotation processing unit 200 sets the rotation angle for the printing data at counterclockwise 270 degrees (step 21). The rotation processing unit 200 stores the rotation angle for the printing data in the setting storage unit 204 (step 25).

Referring back to step 18, description is provided.

If the detected location of the title field is the lower right corner, the rotation processing unit 200 determines whether the location of the title field desired for output is the upper right corner or the lower left corner (step 22).

If the location of the title field desired for output is the lower left corner, the rotation processing unit 200 sets the rotation angle for the printing data at counterclockwise 270 degrees (step 23). The rotation processing unit 200 stores the rotation angle for the printing data in the setting storage unit 204 (step 25).

In contrast, if the location of the title field desired for output is the upper right corner, the rotation processing unit 200 sets the rotation angle for the printing data at counterclockwise 90 degrees (step 24). The rotation processing unit 200 stores the rotation angle for the printing data in the setting storage unit 204 (step 25).

Figure 8:
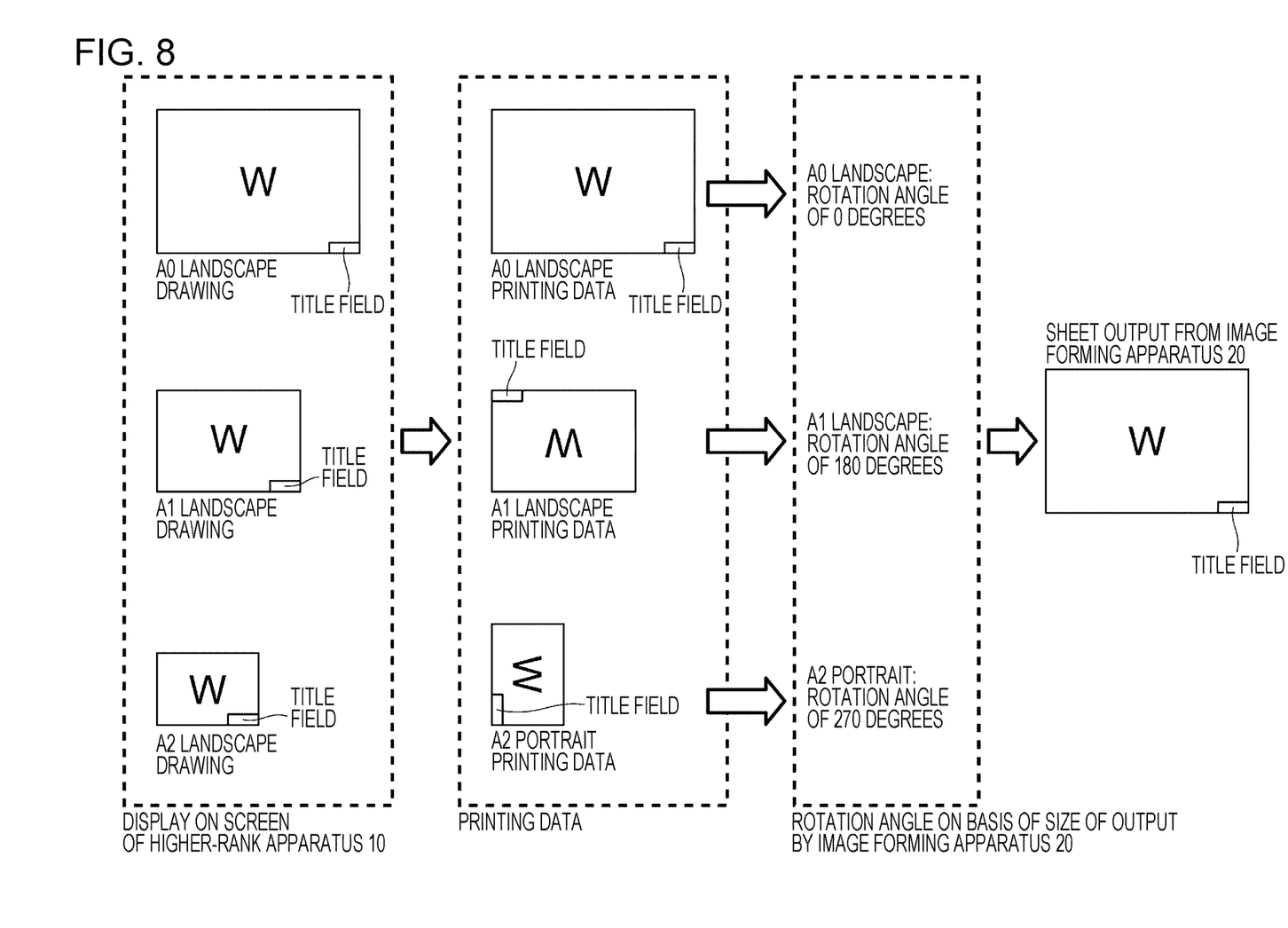
FIG. 8 is a diagram for explaining how the rotation process is executed in Exemplary Embodiment 1.

FIG. 8 is a diagram for explaining how the rotation process is executed in Exemplary Embodiment 1.

In FIG. 8, the title field displayed on the display screen of the higher-rank apparatus 10 is located regardless of the output size and the orientation. Specifically, for any output size, the title field is located in the lower right corner of the display screen. FIG. 8 illustrates examples of respective output sizes of A0, A1, and A2. Each orientation of a corresponding one of drawings to be output is a landscape orientation.

However, the orientation for printing data for a drawing output from the higher-rank apparatus 10 may be different from the orientation of the drawing. For example, landscape printing data is output for an A0 landscape drawing in the same orientation, while landscape printing data rotated counterclockwise through 180 degrees is output for an A1 landscape drawing. Portrait printing data rotated clockwise through 90 degrees is output for an A2 landscape drawing.

Hence, as the rotation angles on a per output size basis in the image forming apparatus 20, the rotation angles are respectively set at zero degrees for the A0 landscape printing data, at 180 degrees for the A1 landscape printing data, and at 270 degrees for the A2 portrait printing data.

As the result, for any output size, an image having the title field located in the lower right corner is output from the image forming apparatus 20.

In a case where the combination of the output size and the orientation in the printing data is used for the first time, the rotation angle per combination of an output size and an orientation is decided after the location of the title field is projected. In a case where the combination is used second time or after, the rotation angle stored in the first time use is read out and is then used.

In this exemplary embodiment, the process for deciding the rotation angle after projecting the location of the title field is executed per combination of the output size and the orientation in the printing data. Accordingly, compared with the case where every time the printing data is input in the image forming apparatus 20, the rotation angle is decided after the location of the title field is projected, processing time is reduced.

Also in this exemplary embodiment, a user does not have to manually input the rotation angle desired for outputting the printing data, for each combination of the output size and the orientation in the printing data, and the work load on the user is also reduced.

Exemplary Embodiment 2

Exemplary Embodiment 1 assumes the case where the rotation angle for the combination of an output size and an orientation is automatically set while printing data for actually performing printing is being used. For this exemplary embodiment, a case where a learning mode for learning a rotation angle is prepared will be described.

Figure 9A:
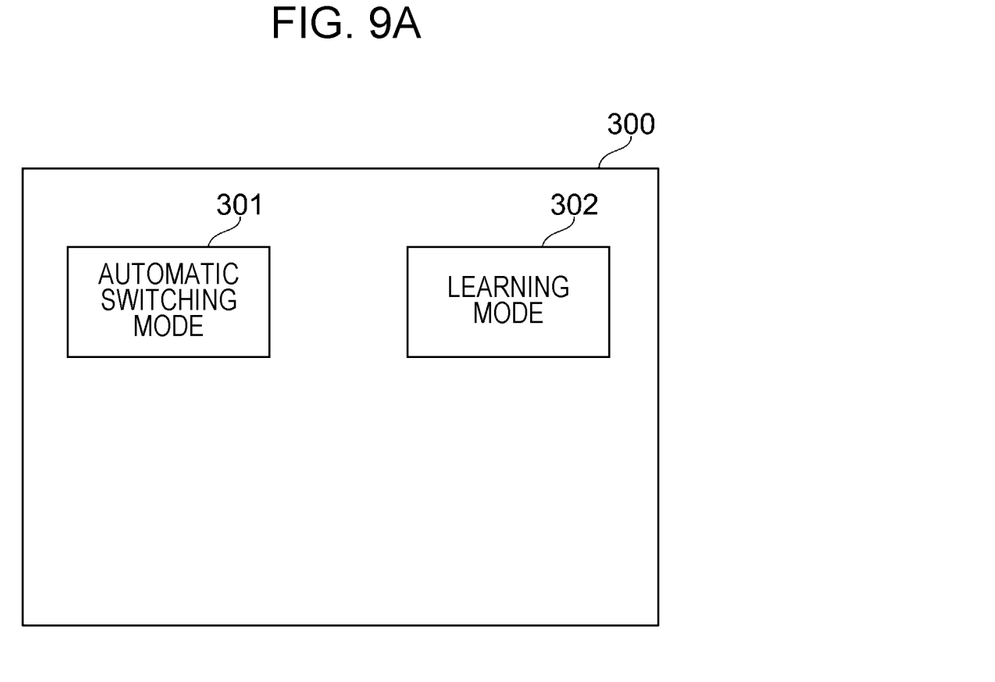
FIGS. 9A and 9B are each a diagram for explaining an example screen used for designating an operation mode used in Exemplary Embodiment 2 and respectively illustrate a screen used for designating an operation mode and a screen that is displayed when a learning mode is designated.
Figure 9B:
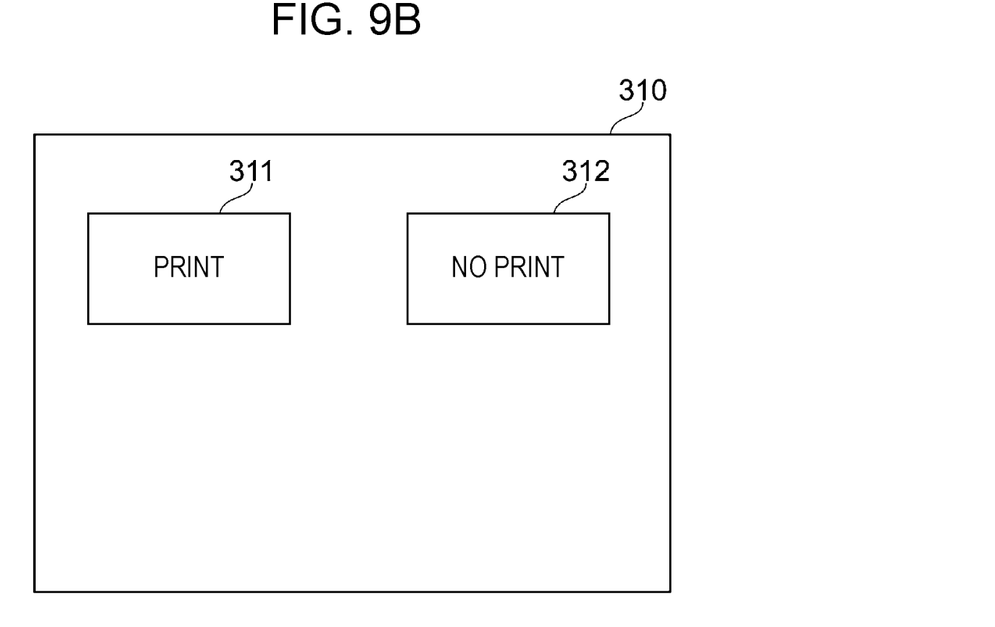

FIGS. 9A and 9B are each a diagram for explaining an example screen used for designating an operation mode used in Exemplary Embodiment 2 and respectively illustrate a screen 300 used for designating an operation mode and a screen 310 that is displayed when a learning mode is designated.

The screen 300 is provided with an automatic switching mode designation button 301 and a learning mode designation button 302.

Among these, the automatic switching mode designation button 301 is provided to automatically perform switching between operation modes depending on whether the rotation angle has been stored in the setting storage unit 204, as described for Exemplary Embodiment 1.

The learning mode designation button 302 is provided to learn a rotation angle in advance by using printing data used for the learning before the printing data for actually performing printing is used.

When the learning mode is designated, the screen 310 including a print button 311 and a no print button 312 is displayed. The print button 311 is operated in a case where a printed matter to which the rotation angle learned on the basis of the printing data used for the learning is applied is intended to be printed. The no print button 312 is operated in a case where only learning of the rotation angle is to be performed and where the printed matter is not to be printed.

Figure 10:
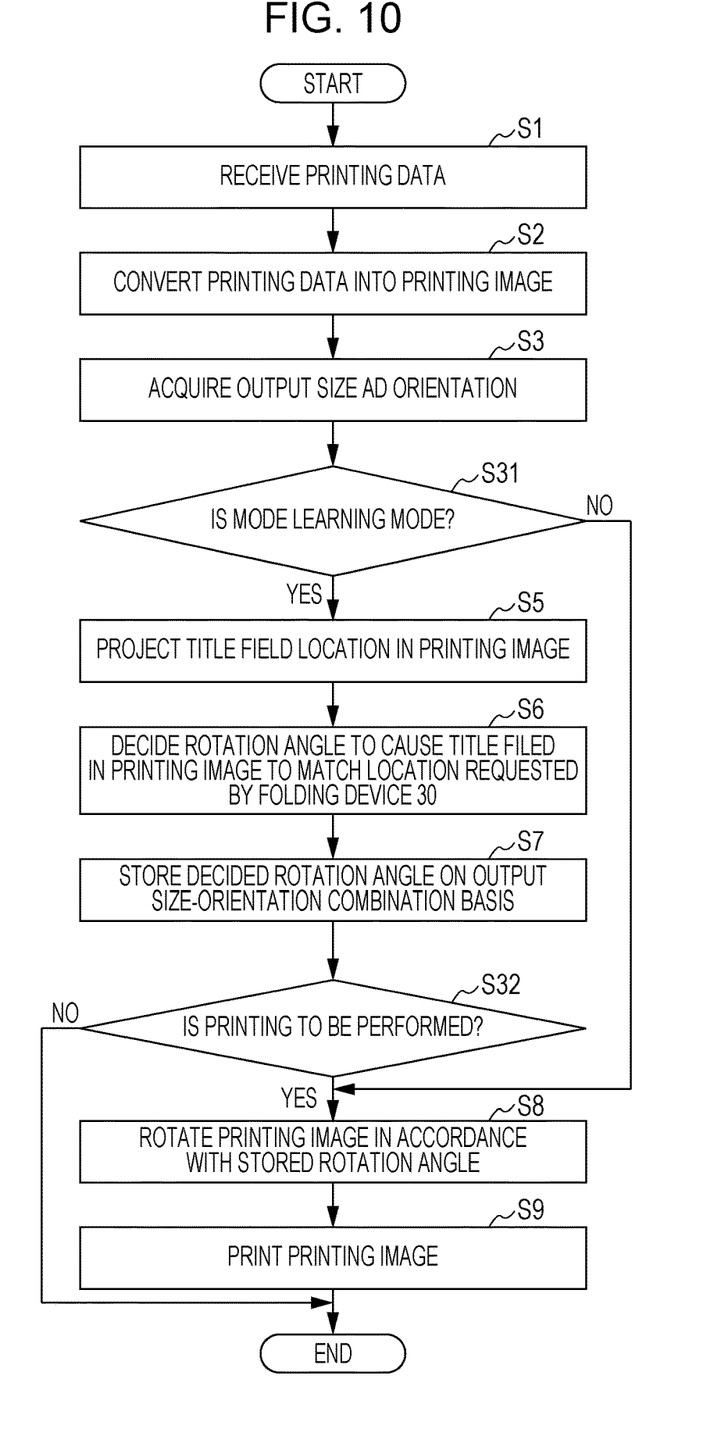
FIG. 10 is a flowchart for explaining a rotation process executed by the rotation processing unit used in Exemplary Embodiment 2.

FIG. 10 is a flowchart for explaining a rotation process executed by the rotation processing unit 200 (see FIG. 4) used in Exemplary Embodiment 2. References S in FIG. 10 denote steps. In FIG. 10, steps corresponding to those in FIG. 6 are denoted by the same step numbers.

In FIG. 10, a difference from Exemplary Embodiment 1 lies in that printing data used for the learning is input in step 1. Also in this case, the printing data is converted into a printing image, and the output size and the orientation for the printing image are acquired (steps 2 and 3).

In this exemplary embodiment, after step 3, the rotation processing unit 200 determines whether the operation mode is the learning mode (step 31).

If the result is affirmative in step 31, the rotation processing unit 200 performs steps 5 to 7 in the same manner as in Exemplary Embodiment 1 on the printing image converted from the printing data for the learning. Specifically, the location of the title field is projected, and then the storing step is performed. In the storing step, the rotation angle for causing the projected location of the title field to match the location requested by the folding device 30 is stored in the setting storage unit 204 (see FIG. 4).

Thereafter, the rotation processing unit 200 determines whether the user intends to perform printing or not perform printing (step 32).

If the result is negative in step 32, the rotation processing unit 200 terminates the process without printing a printed matter.

In contrast, if the result is affirmative in step 32, or if the result is negative in step 31, the rotation processing unit 200 rotates the printing image in accordance with the stored rotation angle (step 8), and then the rotated printing image is printed (step 9).

Since the rotation angle is learned before the printing data actually used for printing is input in the image forming apparatus 20 (see FIG. 1), a processing time taken until the printing and the outputting of a printed matter corresponding to the printing data actually used for printing is made shorter than that in Exemplary Embodiment 1.

Designating no print leads to the rotation angle learning without consuming a recording material such as ink or toner used on the sheet or in image forming.

In contrast, if the user intends to verify whether the decided rotation angle results in the location desired for output, the user may designate print.

Exemplary Embodiment 3

Exemplary Embodiments 1 and 2 described above assume the case where there is the one higher-rank apparatus 10 (see FIG. 1), while this exemplary embodiment assumes a case where there are the multiple higher-rank apparatuses 10.

Figure 11:
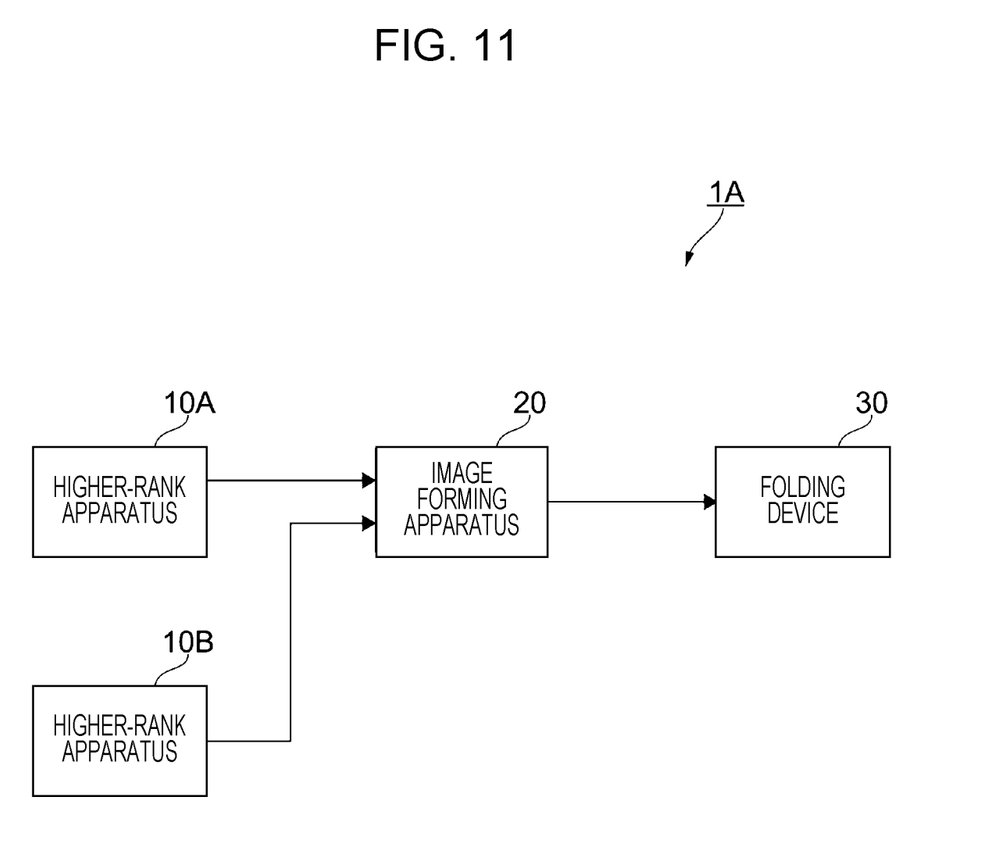
FIG. 11 is a diagram for explaining the conceptual configuration of an image processing system used in Exemplary Embodiment 3.

FIG. 11 is a diagram for explaining the conceptual configuration of an image processing system 1A used in Exemplary Embodiment 3. FIG. 11 illustrates components denoted by reference numerals corresponding to those in FIG. 1.

In FIG. 11, higher-rank apparatuses 10A and 10B are connected to the image forming apparatus 20. In this exemplary embodiment, the type of the CAD program installed on the higher-rank apparatus 10A is different from the type of the CAD program installed on the higher-rank apparatus 10B.

In this case, it is likely that printing data output from the higher-rank apparatus 10A and printing data output from the higher-rank apparatus 10B have the same output size and the same orientation but different title field locations.

Hence, in this exemplary embodiment, the rotation angle for the combination of an output size and an orientation is stored in the setting storage unit 204 (see FIG. 4) on a per higher-rank apparatus basis.

Figure 12:
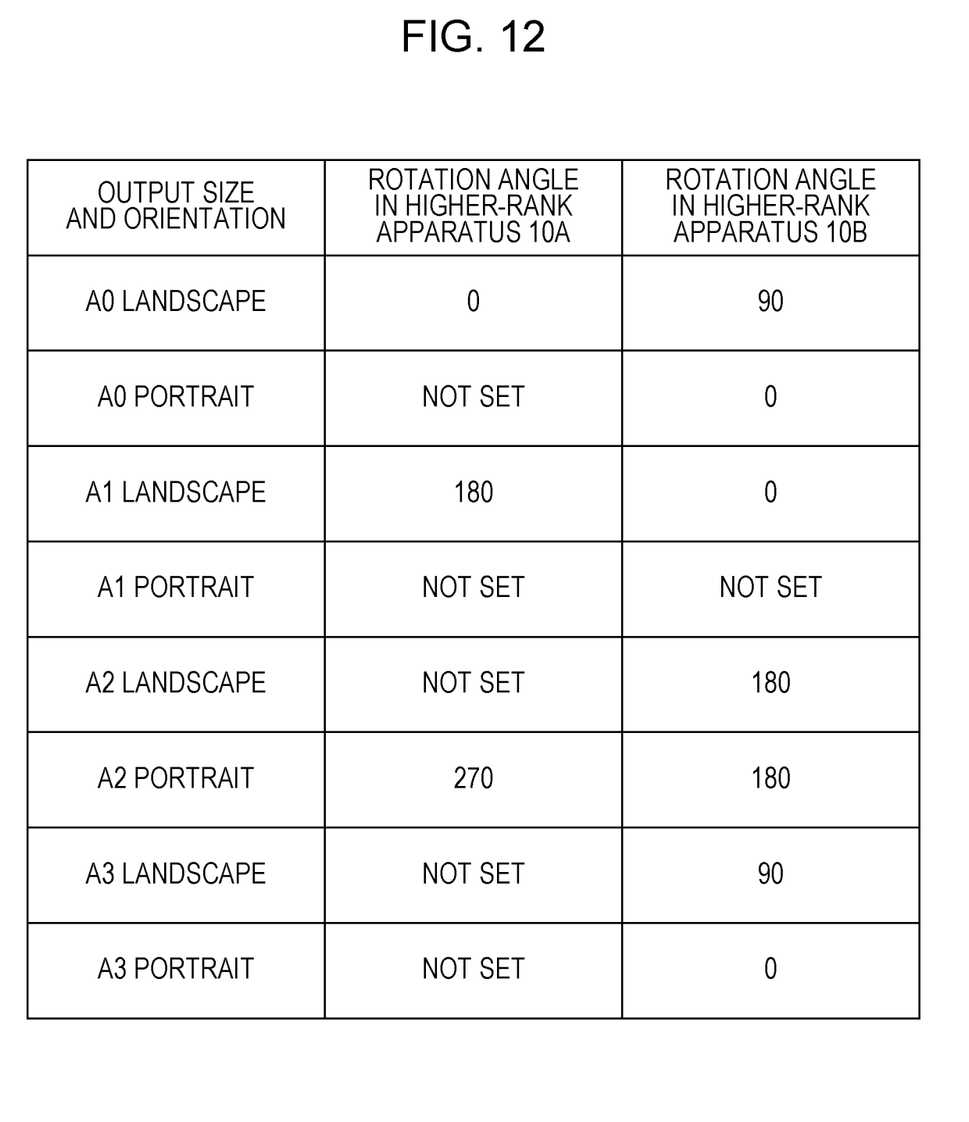
FIG. 12 is a table illustrating examples of settings of a rotation angle for an output size and an orientation that are stored in the setting storage unit used in Exemplary Embodiment 3.

FIG. 12 is a table illustrating examples of settings of a rotation angle for an output size and an orientation that are stored in the setting storage unit 204 used in Exemplary Embodiment 3.

The settings for the higher-rank apparatus 10A illustrated in FIG. 12 are the same as those for the higher-rank apparatus 10 described for Exemplary Embodiment 1. In contrast, in the settings for the higher-rank apparatus 10B, the rotation angle is set at 90 degrees for the A0 and A3 sheets transported in the long edge direction, the rotation angle is set at zero degrees for the A0 and A3 sheets transported in the short edge direction and the A1 sheet transported in the long edge direction, and the rotation angle is set at 180 degrees for the A2 sheets respectively transported in the long edge direction and the short edge direction. In contrast, the rotation angle is not set for the A1 sheet transported in the short edge direction.

In this exemplary embodiment, even if pieces of printing data are output from respective different apparatuses or by respective different programs, printed matters each having the title field printed in the location requested by the folding device 30 (see FIG. 1) are output.

Other Exemplary Embodiments

The exemplary embodiments of the present disclosure have heretofore been described; however, the technical scope of the present disclosure is not limited to the scope of the description of the exemplary embodiment above. From the description of the scope of claims, it is apparent that the technical scope of the disclosure includes various modifications and improvements made to the exemplary embodiments described above.

Switching is automatically performed between the two types of rotation modes in Exemplary Embodiment 1; however, the user may manually designate the use of one of the two types of rotation modes every time printing is performed.

In the aforementioned exemplary embodiments, the rotation processing unit 200 (see FIG. 4) is provided as one of the functions of the image forming apparatus 20 (see FIG. 1). However, an information processing apparatus corresponding to the rotation processing unit 200 may be provided in the higher-rank apparatus 10 (see FIG. 1) or in an apparatus placed between the higher-rank apparatus 10 and the image forming apparatus 20.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a receiving unit that receives printing data; and
a processor configured to:
  convert the printing data to a printing image;
  acquire an output size and orientation from the printing image; and
  determine whether a rotation angle is stored for the acquired output size and orientation,
wherein when it is determined that the rotation angle is stored for the acquired output size and orientation, the processor is further configured to rotate the printing image in accordance with the stored rotation angle, and
wherein when it is determined that the rotation angle is not stored for the acquired output size and orientation, the processor is further configured to project a location of a specific image in a title image, to determine the rotation angle to cause the specific image to match a requested location, and to rotate the printing image in accordance with the determined rotation angle.

2. The information processing apparatus according to claim 1,
wherein when it is determined that the rotation angle is not stored for the acquired output size and orientation, a location of a specific image included in an image corresponding to the printing data is projected, and the angle for the rotation is decided to cause the projected location to match the requested location desired in folding finishing.

3. The information processing apparatus according to claim 2,
wherein a relationship between the output size in the printing data and the angle for the rotation to be used is stored in a memory in association with a higher-rank apparatus.

4. The information processing apparatus according to claim 2,
wherein the specific image is designated in advance by a user.

5. The information processing apparatus according to claim 1,
wherein a relationship between the output size in the printing data and the angle for the rotation to be used is stored in a memory in association with a higher-rank apparatus.

6. The information processing apparatus according to claim 1,
wherein when it is determined that the rotation angle is not stored for the acquired output size and orientation, whether to output a sheet undergoing the rotation through the angle decided in accordance with the analysis of the content of the printing data is decided in accordance with a setting on the screen.

7. A non-transitory computer readable medium storing a program causing a computer to execute a process comprising:
converting the printing data to a printing image;
acquiring an output size and orientation from the printing image;
determining whether a rotation angle is stored for the acquired output size and orientation;
when the determining determines that the rotation angle is stored for the acquired output size and orientation, rotating the printing image in accordance with the stored rotation angle; and
when the determining determines that the rotation angle is not stored for the acquired output size and orientation, projecting a location of a specific image in a title image to determine the rotation angle to cause the specific image to match a requested location, and rotating the printing image in accordance with the determined rotation angle.

8. An information processing apparatus comprising:
means for receiving printing data; and
processing means configured to:
convert the printing data to a printing image;
acquire an output size and orientation from the printing image; and
determine whether a rotation angle is stored for the acquired output size and orientation,
wherein when it is determined that the rotation angle is stored for the acquired output size and orientation, the processor is further configured to rotate the printing image in accordance with the stored rotation angle, and
wherein when it is determined that the rotation angle is not stored for the acquired output size and orientation, the processor is further configured to project a location of a specific image in a title image, to determine the rotation angle to cause the specific image to match a requested location, and to rotate the printing image in accordance with the determined rotation angle.

* * * * *